Aug. 6, 1963

W. H. SPIRI 3,099,917

KELLY BUSHING

Filed Oct. 6, 1961

INVENTOR.
WILLY H. SPIRI
BY
William P. Green
ATTORNEY

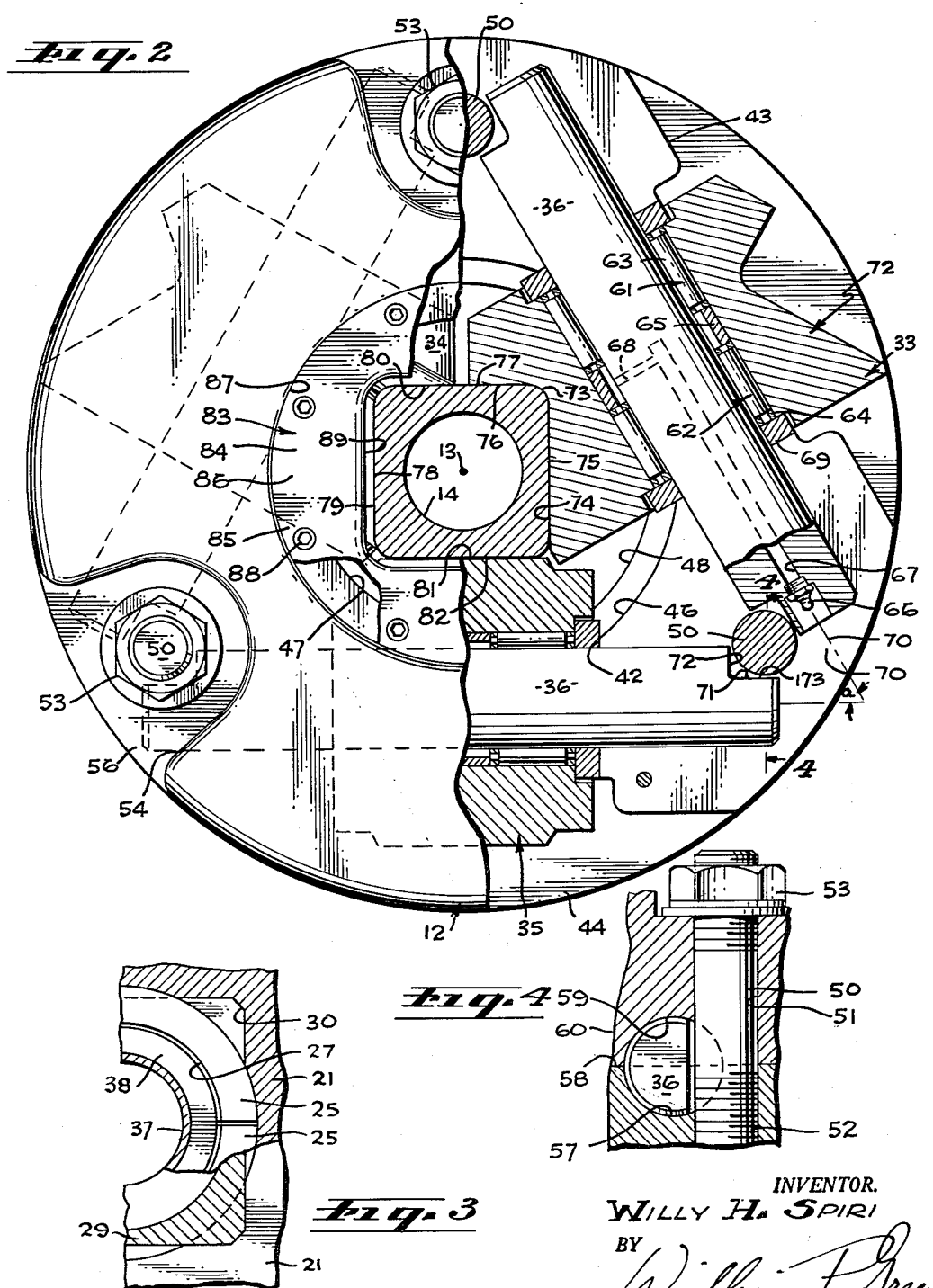

Aug. 6, 1963  W. H. SPIRI  3,099,917
KELLY BUSHING
Filed Oct. 6, 1961  3 Sheets-Sheet 3
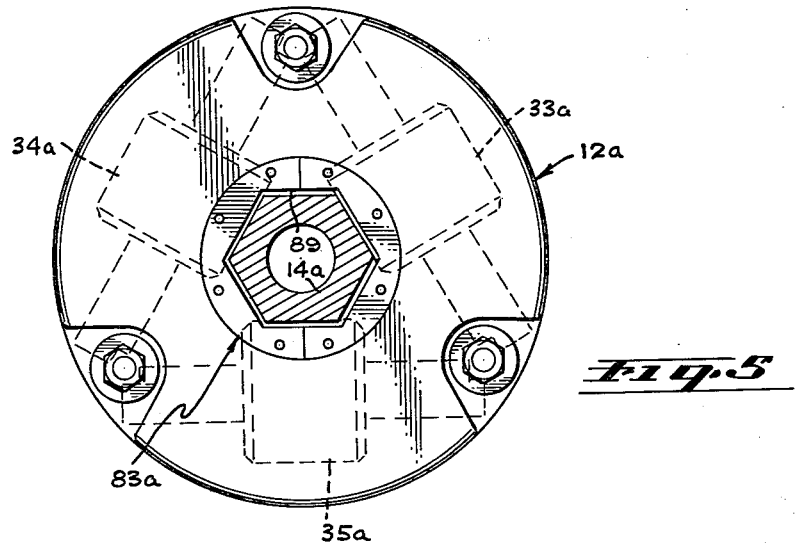
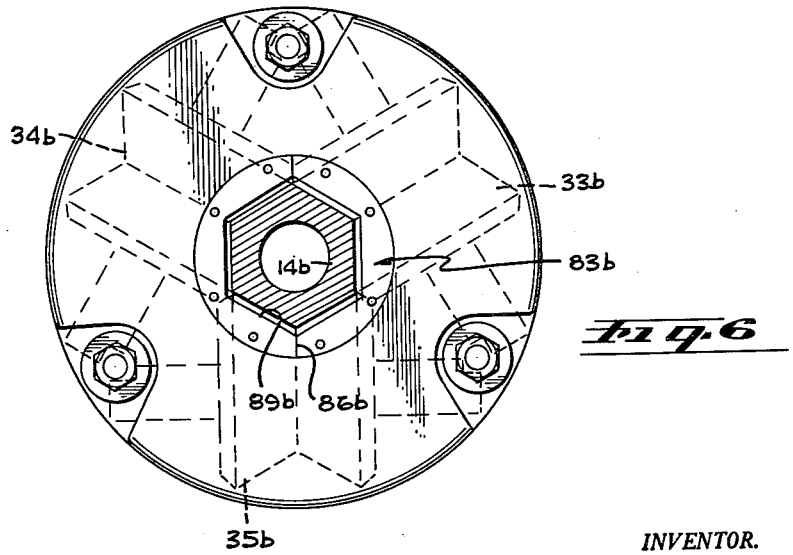
INVENTOR.
WILLY H. SPIRI
BY William P. Green
ATTORNEY 3,099,917
Patented Aug. 6, 1963

---

3,099,917
KELLY BUSHING
Willy H. Spiri, Whittier, Calif., assignor to Abegg & Reinhold Co., Los Angeles, Calif., a corporation of California
Filed Oct. 6, 1961, Ser. No. 143,358
13 Claims. (Cl. 64—23.7)

This invention relates to improved kelly bushings for use in rotatively driving a kelly within a well drilling rotary table.

The general object of the invention is to provide certain improvements in kelly bushings of the roller type, that is, bushings in which rollers are provided for engaging the sides of and transmitting rotary motion to a coacting kelly. Several specific objects of the invention are to improve the manner of mounting the rollers in a bushing of this type, as well as to improve the effectiveness with which the rollers engage the sides of a coacting kelly, and to protect the rollers against damage by the kelly in use.

Desirably, the rollers are mounted by individual shafts spaced about the main vertical axis of the bushing. A particular feature of the invention resides in a unique manner of retaining one or more of these shafts in a predetermined assembled position relative to the body of the kelly bushing. In accordance with the invention, at least one of the roller shafts may be retained against axial and/or rotary movement by means of a dual purpose fastener which, in addition to its shaft retaining function, also serves to secure together two sections of the body structure. This fastener is preferably a threaded stud (the term "stud" being used broadly as included headed bolts as well as threaded elements without heads). The fastener may project upwardly from one of the body sections through the other to retain the two sections together. The stud or fastener may be partially received within a recess in an associated one of the roller mounting shafts, in a relation preferably blocking both axial and rotary movements of the shaft. Desirably, a plurality of such fasteners are provided at different locations about the main vertical axis of the kelly bushing, with each fastener serving to engage and prevent movement of two adjacent shafts.

In one form of the invention, the bushing is designed especially for engagement with a kelly of essentially square cross-section. In this arrangement, certain features of novelty reside in a unique three roller arrangement for engaging such a four sided square kelly. Additional features of the invention has to do with the provision, at a location above the rollers, of means carried by the body of the kelly bushing and forming a non-circular opening adapted to pass the kelly downwardly into engagement with the rollers, but serving to prevent downward movement of an upper box joint end of the kelly, or other enlargement, into contact with the rollers. Thus, this upper roller protector arrangement acts to shield the rollers against damage by the usual enlargement at the upper end of the kelly. Desirably, the protector is removable, and for best results is formed of two sections to facilitate removal while a kelly is received within the bushing.

The above and other features and objects of the present invention will be better understood from the following detailed description of the typical embodiments illustrated in the accompanying drawings in which:

FIG. 2 is an enlarged view taken on line 2—2 of FIG. 1;

FIG. 3 is a fragmentary horizontal section, the lower portion of which is taken on line 3—3 of FIG. 1, and the upper portion of which is broken away to the plane designated by the line 3a—3a in FIG. 1;

FIG. 4 is a fragmentary vertical section taken on line 4—4 of FIG. 2; and

FIGS. 5 and 6 are plan views of two variational roller arrangements which may be utilized in the present bushing structure.

Figure 1:
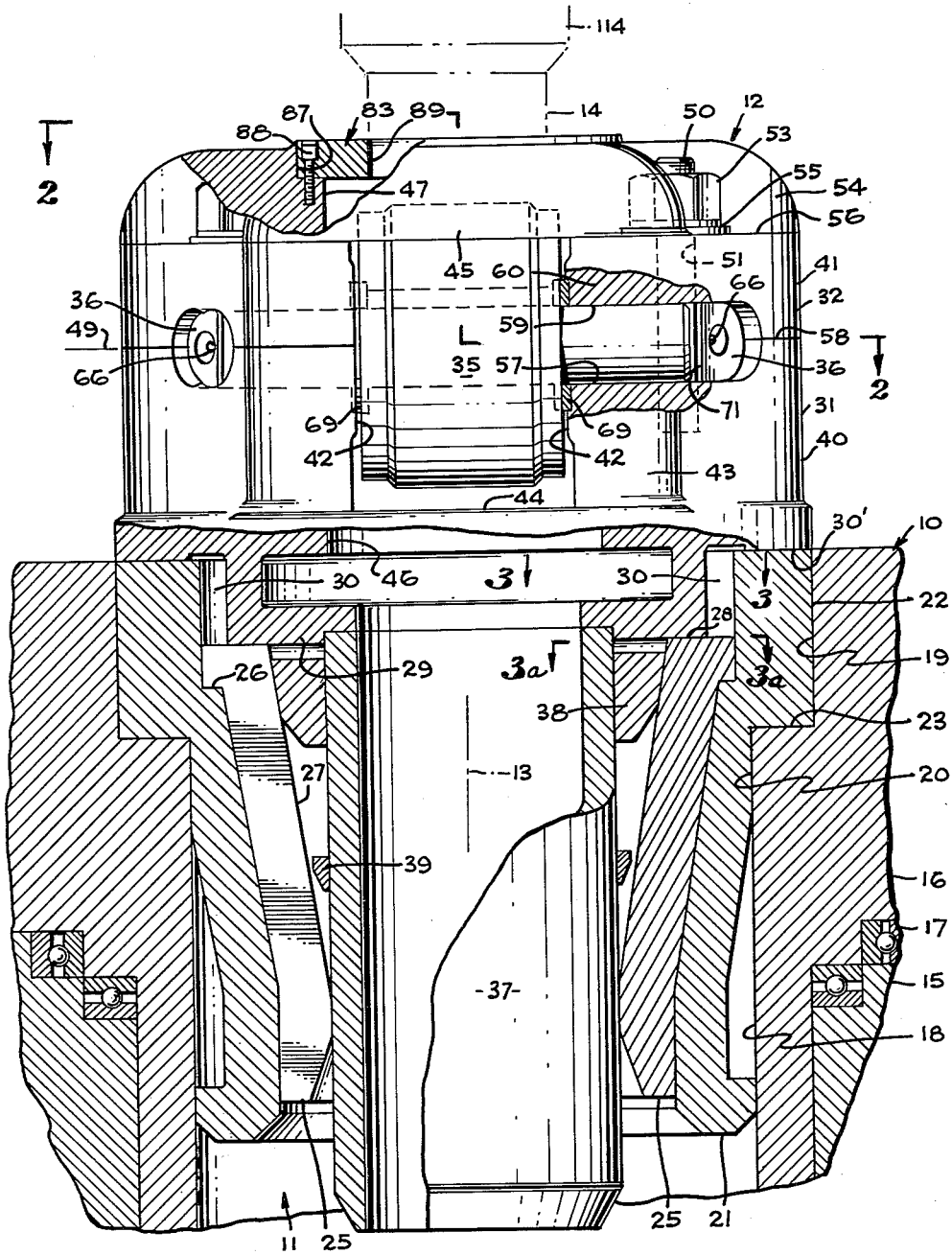
FIG. 1 is a side view, partially in section and partially in elevation, of a first form of kelly bushing embodying the invention.

Referring first to FIG. 1, I have shown fragmentarily at 10 a rotary table structure of the type conventionally used in drilling wells. Within the rotary table there is positioned a master bushing assembly generally indicated at 11, and within the master bushing there is shown a kelly bushing 12 with whose construction the present invention is particularly concerned. Bushing 12 acts to transmit rotary motion about vertical axis 13 from rotary table 10 to a conventional kelly, which is connected to the drill string. The kelly which is utilized with the FIGS. 1 to 4 form of the invention is represented at 14 in FIG. 2, and is externally square in horizontal section. This square cross-section continues along the entire vertical extent of the kelly, except at its upper and lower ends at which the kelly has the usual enlarged joint ends for connection at the upper end of the kelly to a swivel, and at the lower end of the kelly to the drill string. In FIG. 1, the kelly is represented partially in broken lines, with the upper enlargement of the kelly being designated 114. As will be understood, the kelly is free to move vertically along axis 13 relative to the rotary table and bushing assembly as the table turns, with the kelly being positively driven by the kelly bushing in any vertical position of the kelly.

Table 10 includes a stationary portion represented at 15 and a movable section 16 mounted by bearings 17 for powered rotation about axis 13. Section 16 of the rotary table contains a central vertically extending opening 18, whose upper portion 19 is of non-circular, preferably square, horizontal section, and whose lower portion 20 may be cylindrical.

Master bushing assembly 11 typically includes an outer tubular one piece element 21, having an upper externally square portion 22 received within and driven by the square recess 19 in the rotary table. Element 21 is supported in the movable rotary table section on a shoulder 23. In addition to element 21, the master bushing assembly may include two complementary semi-circular slip bowl segments 25, supported in element 21 on a shoulder 26, and adapted when placed in part 21 to form together a composite slip bowl structure of annular configuration presenting a downwardly tapering inner surface 27.

Upwardly beyond top surfaces 28 of slip bowl segments 25, outer part 21 of the master bushing assembly is shaped to form an upper square portion of the opening or recess which extends vertically through part 21, which square portion receives and rotatably drives the correspondingly square portion 29 of kelly bushing 12. To form this square recess, the inner wall of part 21 (above the level of surfaces 28), forms four evenly spaced corner recesses 30 (see FIG. 3) into which the corners of square 29 project diving relation. Above square 29, the kelly bushing body may form a horizontal shoulder 30' engaging the upper end of part 21 in a relation supporting the kelly bushing on the master bushing.

The rotary table and master bushing structure described very briefly above have been illustrated and described only as representations of the environment in which the kelly bushing 12, with which the present invention is particularly concerned, may be utilized. To now describe in detail the construction of the kelly bushing itself, this bushing includes two main body sections 31 and 32, to which there are rotatably mounted three kelly engaging rollers 33, 34 and 35 (see FIG. 2), carried by individual shafts 36. To the lower body section 31, there may be rigidly attached a downwardly projecting centering tube 37, carrying a movable centering ring 38, both as described and claimed in detail in my Patent No. 2,904,311, issued September 15, 1959, on "Kelly Bushing Centering Means." As brought out in that Patent, ring 38 is free for movement vertically relative to pipe 37, between a lower position in which ring 38 rests on a stop ring 39 secured to pipe 37, and an upper position of engagement with the underside of square 29.

The two sections 31 and 32 of the kelly bushing are formed of rigid high-strength matreial, such as a suitable steel. Externally, sections 31 and 32 have cylindrical outer surfaces 40 and 41, centered about main axis 13 of the kelly bushing, and of a common diameter to form together an essentially cylindrical vertically extending body. These surfaces 40 and 41 are interrupted at the locations of the three rollers 33, 34 and 35, to form at each of those locations two parallel generally radially extending vertical surfaces 42 between which the associated roller is received. In extending from each of these surfaces 42 to the nearest portion of cylindrical surface 40 or 41, the outer surface of each section 31 and 32 has a portion 43 which is in the same vertical plane as a corresponding portion 43 at the opposite side of the roller. Beneath each roller 33, 34 or 35, body section 31 has a portion 44 which is not interrupted at the roller location, so that the section 31 has a lower circularly continuous portion of slightly increased diameter which forms shoulder 30' at its underside. Similarly, upper section 32 has a top portion 45 extending across the upper side of each roller, and suitably recessed to receive and avoid interference with the associated roller.

Internally, the two body sections 31 and 32 have circular vertically aligned openings 46 and 47, and the lower square drive portion 29 of section 31 has a similar somewhat smaller diameter opening 48, with all of these openings being centered about main axis 13 of the device, to pass the kelly 14 vertically entirely through the bushing. The roller receiving apertures or recesses are so positioned that rollers 33, 34 and 35 can project into the central opening of the kelly bushing, as seen in FIG. 2, for driving engagement with the kelly. The portions of body sections 31 and 32 which are located circularly between these successive rollers have horizontal planar surfaces which abut against one another in the horizontal plane designated at 49 in FIG. 1. These surfaces are secured in tight innerengagement by three circularly spaced studs 50, which project downwardly through openings 51 in top section 32, and are threadedly and very tightly connected into bottom section 31 at 52 (see FIG. 4). Nuts 53, attached to the upper ends of studs 50, are received within recesses 54 in the upper surface of section 32, and tighten washers 55 downwardly against horizontal surfaces 56 forming the bottoms of recesses 54, to tighten section 32 downwardly against section 31. In the arrangement illustrated in FIGS. 1 through 4, there are provided three of the discussed studs 50, extending parallel to axis 13 at three locations spaced circularly thereabout.

Each of the rollers 33, 34 and 35 is mounted rotatably by an individual shaft 36, which is confined between sections 31 and 32 when these sections are tightened together. More particularly, the lower half of each shaft is received and confined within a horizontal upwardly facing groove or recess 57 of semi-cylindrical configuration, formed in the upper planar surface 58 of section 31'. A similar downwardly facing semi-cylindrical groove or recess 59, formed in the upper surface 60 of top section 32, receives and confines the upper half of each shaft 36. These recesses 57 and 59 are provided at both sides of each roller 33, 34 or 35, and continue outwardly to the outer cylindrical surface 40 or 41. Shafts 36 are externally cylindrical, and are of the same diameter as are semi-cylindrical complementary recesses 57 and 59, to be effectively received and confined therein when the two sections 31 and 32 are secured together. The portion of each shaft 36 which is received between the two vertical surfaces 42 carries the associated roller 33, 34 or 35, with two roller bearing assemblies 61 and 62 (FIG. 2) desirably being provided radially between the roller and shaft. Each of the assemblies 61 and 62 includes a series of circularly spaced rollers 63 retained at their opposite ends by conventional retainers 64, with the two inner retainers of assemblies 61 and 62 being spaced apart by an annular spacer sleeve represented at 65. Grease or other lubricant is supplied to the roller bearings through a grease fitting 66 which is accessible at one end of the shaft, and which communicates through passages 67 and 68 with the space axially between roller bearing assemblies 61 and 62. Two rings 69 at opposite ends of the rollers may serve as thrust bearings, and also as grease retainers.

The three shafts 36 are preferably so mounted that their axes 70 (FIG. 2) all lie in a common horizontal plane, and form together an equilateral triangle, having a 60° angle $a$ at each of its corners. The three shafts may all be identical, and are so designed as to be retained by studs 50 against movement relative to the body sections. For this purpose, the complementary semi-cylindrical recesses 57 and 59 receiving each shaft are so positioned that portions of the studs 50 for securing sections 31 and 32 together are received within recesses 57 and 59, at the ends of the various shafts. Desirably, approximately one-half of the cross-section of each stud 50 is received within recesses 57 and 59 at the plane 49 at which sections 31 and 32 engage. The ends of shafts 36 are then cut away or recessed as shown at 71 in FIG. 2, so that the studs 50 are received within these end recesses within the shafts. Engagement of transverse surfaces or shoulders 72 (formed within recesses 71) with studs 50 prevents axial movement of shafts 36, while engagement of the axially extending planar surface 173 within each recess with the coacting stud 50 prevents rotary movement of each shaft about its individual axis 70. Thus, the studs 50 act in very simple fashion to positively locate shafts 36, and restrain them against either axial or rotary movement (about their individual axes 70) relative to the body of kelly bushing 12.

In order that the rollers 33, 34 and 35 may engage the square kelly 14 in optimum power transmitting relation, it is preferred that the rollers have the unique peripheral shapes illustrated in FIG. 2. Describing first the roller 33, this roller has an annular peripheral generally V-shaped groove 72' within which one of the corners 73 of kelly 14 is received, with groove 72' having a first surface 74 engaging a first side 75 of the kelly along substantially the entire horizontal width of that side. A second surface 76 of roller 33 engages a second side 77 of the kelly, but is shorter than surface 74 to engage only approximately one-half of the horizontal width of side 77 of the kelly. The second roller 34 is the mirror image of roller 33, as viewed in plan or in horizontal section, having a surface 78 engaging the third side 79 of kelly 14 across substantially its entire horizontal width (and therefore corresponding to surface 74 of roller 33), and having a second and shorter surface 80 engaging the second half of the horizontal width of side 77 of the kelly. The third roller 35 has a preferably straight cylindrical outer surface 81, extending parallel to and centered about axis 70 of roller 35, and preferably engaging a fourth side 82 of the square kelly across substantially the entire width of that side. It is noted that in the optimum arrangement of FIG. 2, surfaces 74 and 78 of rollers 33 and 34 respectively are disposed at a somewhat smaller angle to the axes of their respective rollers than are the other surfaces 76 and 80 of rollers 33 and 34. The three roller arrangement illustrated in FIG. 2 for driving a square kelly has proven extremely effective for transmitting rotary forces to such a kelly with maximum effectiveness. In this connection, it is noted that where the present specification and claims refer to a square kelly, this term is intended to be broad enough to cover also a kelly arrangement in which the cross-section of the kelly might be of rectangular essentially four sided configuration, with two of the sides of the rectangle perhaps being longer than the other two.

For preventing the upper enlargement or box end 114 of kelly 14 from moving downwardly into engagement with rollers 33, 34 and 35, and damaging those rollers, I provide at the top of upper body section 32 a roller protecting plate 83, desirably formed of two sections 84 and 85. These sections are semi-circular, and complementary, meeting in a vertical plane 86 disposed diametrically with respect to axis 13. Sections 84 and 85 may be received within an annular recess 87 formed in the upper surface of part 32, and be secured to part 32 by a series of circularly spaced bolts 88. Externally, the ring formed by sections 84 and 85 is circular, while internally the ring forms a square opening 89 shaped essentially in correspondence with the outer surface of square kelly 14, and only slightly larger than the kelly, so that the kelly may pass downwardly through opening 89 to engage rollers 33, 34 and 35. As will be apparent from FIG. 1, opening 89 is small enough to positively prevent upper enlargement 114 from passing downwardly through protector 83, so that this enlargement can not possibly engage and damage the rollers. The slight increase in size of opening 89 as compared with kelly 14 allows the kelly to swing slightly relative to the rollers and bushing structure, to positions somewhat offset from true vertical alignment with respect to axis 13, during the drilling of a well.

To now describe the use of the apparatus shown in FIGS. 1 to 4, assume that the master bushing assembly and kelly bushing are properly located in their FIG. 1 positions within the rotary table, and that the kelly 14 is also in place within the apparatus. The rotary table is then actuated to turn the master bushing and kelly bushing, and by virtue of engagement of rollers 33, 34 and 35 with the kelly, to turn the kelly and the attached drill string. When it becomes necessary to replace any of the rollers, this may be done very easily by merely removing nuts 53, thereby allowing top section 32 of the kelly bushing to be drawn upwardly, leaving the rollers and shafts accessible for easy removal and replacement. If protector 83 becomes worn, or if it is desired to substitute a different protector of a different shape corresponding to one of those to be discussed later in connection with FIGS. 5 and 6, the protector may be very easily detached by merely removing bolts 88. The sectional formation of protector 83, of two semicircular halves 84 and 85, allows these halves to be removed while the kelly remains in place and the rest of the apparatus is completely assembled. This would not be the case if unit 83 were formed as a single circularly continuous ring of material about the kelly.

FIG. 5 shows a slightly variational form of kelly bushing 12a, which may be considered identical with bushing 12 of FIGS. 1 to 4, except in the respects discussed below. The kelly 14a which is used with the device of FIG. 5 is hexagonal in cross-section, and rollers 33a, 34a and 35a are all externally of straight cylindrical configuration for engaging alternate ones of the six sides of the kelly. The two section roller protector 83a is the same as protector 83 of the first form of the invention, except that the inner opening 89 is of hexagonal shape, rather than square. As in the first form of the invention, protector 83a prevents movement of an upper enlargement on kelly 14a downwardly into engagement with the rollers.

FIG. 6 shows in plan view another form of the invention which is identical with that of FIG. 5, except that the rollers 33b, 34b and 35b contain peripheral V-shaped grooves so that each of the rollers engages two successive sides of the hexagonal kelly 14b. Protector 83b is the same as protector 83 of FIG. 5, being formed of two sections meeting along lines 86b, and forming together an inner hexagonal opening 89b slightly larger than the external cross-section of the kelly.

I claim:
1. A kelly bushing for driving a kelly of generally square cross-section, having four sides meeting essentially at four corners, said bushing including a bushing body structure adapted to be removably mounted to a well drilling rotary table and to be rotatively driven thereby about a predetermined axis, three rollers for engaging and driving said kelly, and means for mounting said rollers to said body structure for rotation relative thereto about three individual axes and at locations spaced circularly about said first mentioned axis, a first of said rollers containing a peripheral recess for receiving a first corner of said kelly and engaging first and second perpendicular sides of the kelly, a second of said rollers containing a peripheral recess for receiving a second corner of the kelly and engaging said second side thereof and also a third side disposed parallel to said first side, the third roller having a surface for engaging a fourth side of the kelly disposed parallel to said second side which is engaged by both of the first two rollers.

2. A kelly bushing as recited in claim 1, in which said first and second rollers have first relatively short surfaces each engageable with said second side of the kelly across not more than half of its width, and have second longer surfaces engageable with said first and third sides respectively of the kelly and each across the major portion of its width.

3. A kelly bushing as recited in claim 1, in which said first and second rollers have first relatively short surfaces each engageable with said second side of the kelly across not more than half of its width, and have second longer surfaces engageable with said first and third sides respectively of the kelly and each across the major portion of its width, said surface of the third roller being essentially cylindrical and engageable with said fourth side of the kelly across the major portion of its width.

4. A kelly bushing for driving a well drilling kelly, comprising a bushing body structure adapted to be removably mounted to a rotary table and to be rotatably driven thereby about a predetermined axis, at least one roller for engaging and driving said kelly, and a shaft carried by said body structure and mounting said roller for rotation about a predetermined axis, said body structure including two body sections and an externally threaded screw element for securing said sections together, said screw element having a portion positioned essentially in a predetermined path of movement of said shaft at a location to block said movement.

5. A kelly bushing as recited in claim 4, in which said two body sections have complementary recesses partially receiving said shaft and confining it between the sections.

6. A kelly bushing as recited in claim 4, in which said screw element is a threaded stud projecting upwardly from one of said sections through the other and having a nut connected to its upper end for securing the sections together.

7. A kelly bushing as recited in claim 4, in which said two body sections have complementary recesses partially receiving said shaft and confining it between the sections, said screw element being a threaded stud projecting upwardly from one of said sections through the other and having a nut connected to its upper end for securing the sections together, said shaft having a recess within which said stud is at least partially received in a relation blocking the shaft against both axial and rotary movement.

8. A kelly bushing for driving a well drilling kelly, comprising a bushing body structure adapted to be removably mounted to a rotary table and to be rotatably driven thereby about a predetermined axis, at least one roller for engaging and driving said kelly, and a shaft carried by said body structure and mounting said roller for rotation about a predetermined axis, said body structure including two body sections and an externally threaded screw element for securing said sections together, said screw element being positioned in the path of axial movement of the shaft at a location to be engageable by the shaft and block said axial movement thereof.

9. A kelly bushing for driving a well drilling kelly, comprising a bushing body structure adapted to be removably mounted to a rotary table and to be rotatably driven thereby about a predetermined axis, at least one roller for engaging and driving said kelly, and a shaft carried by said body structure and mounting said roller for rotation about a predetermined axis, said body structure including two body sections and an externally threaded screw element for securing said sections together, said shaft having a non-circularly cutaway portion, said screw element having a portion received in said cutaway portion of the shaft at a location to block rotary movement thereof.

10. A kelly bushing for driving a well drilling kelly, comprising a bushing body structure adapted to be removably mounted to a rotary table and to be rotatably driven thereby about a predetermined axis, at least one roller for engaging and driving said kelly, and a shaft carried by said body structure and mounting said roller for rotation about a predetermined axis, said body structure including two body sections and an externally threaded screw element for securing said sections together, said shaft having a non-circularly cutaway portion, said screw element having a portion received in said cutaway portion of the shaft at a location to be engageable thereby and block both rotary and axial movement thereof.

11. A kelly bushing for driving a well drilling kelly, comprising a bushing body structure adapted to be removably mounted to a rotary table and to be rotatably driven thereby about a predetermined axis, a plurality of rollers for engaging and driving said kelly, and a plurality of individual shafts carried by said body structure and mounting said rollers respectively for rotation about individual axes, said body structure including two body sections and at least one externally threaded screw element for securing said sections together, two of said shafts having ends extending into proximity, said screw element being positioned essentially in predetermined paths of movement of both of said proximate ends of said two shafts at a location to block movement of both shafts.

12. A kelly bushing for driving a well drilling kelly, comprising a bushing body structure adapted to be removably mounted to a rotary table and to be rotatably driven thereby about a predetermined axis, a plurality of rollers for engaging and driving said kelly, and a plurality of individual shafts carried by said body structure and mounting said rollers respectively for rotation about individual axes, said body structure including two body sections and at least one externally threaded screw element for securing said sections together, two of said shafts having ends extending into proximity, and containing recesses, said screw element being received within both of said recesses in the shafts at a location to be engageable by the shafts and thereby block rotary and axial movement of both shafts.

13. A kelly bushing for driving a well drilling kelly, comprising a bushing body structure adapted to be removably mounted to a rotary table and to be rotatably driven thereby about a predetermined axis, a plurality of rollers for engaging and driving said kelly, and a plurality of individual shafts carried by said body structure and mounting said rollers respectively for rotation about individual axes, said body structure including two upper and lower body sections and a plurality of externally threaded screw elements projecting upwardly from said lower section through the upper section to secure said sections together, said sections having complementary recesses partially receiving said shafts and confining them between the sections, adjacent ones of said shafts having ends extending into proximity and containing positioning recesses, individual ones of said threaded elements being positioned between two of said proximate ends of adjacent shafts and being at least partially received within two of said positioning recesses at locations to block both axial and rotary movement of those shafts.

References Cited in the file of this patent

UNITED STATES PATENTS

| | | |
|---|---|---|
| 1,508,590 | Boykin | Sept. 16, 1924 |
| 2,144,156 | Johnson | Jan. 17, 1939 |
| 2,169,264 | Long | Aug. 15, 1939 |
| 2,777,670 | Long | Jan. 15, 1957 |